United States Patent
Nyamwange

(10) Patent No.: US 12,034,702 B2
(45) Date of Patent: Jul. 9, 2024

(54) ENHANCING KERNEL SECURITY IN CLOUD ENVIRONMENT BY PERFORMING A RULES-BASED ANALYSIS OF INCOMING DATA PACKETS BEFORE ROUTING THEM TO THE KERNEL

(71) Applicant: Bank of America Corporation, Charlotte, NC (US)

(72) Inventor: Elvis Nyamwange, Little Elm, TX (US)

(73) Assignee: Bank of America Corporation, Charlotte, NC (US)

( * ) Notice: Subject to any disclaimer, the term of this patent is extended or adjusted under 35 U.S.C. 154(b) by 316 days.

(21) Appl. No.: 17/588,455

(22) Filed: Jan. 31, 2022

(65) Prior Publication Data
US 2023/0247002 A1    Aug. 3, 2023

(51) Int. Cl.
*H04L 9/40* (2022.01)
*G06F 9/54* (2006.01)
*H04L 9/32* (2006.01)

(52) U.S. Cl.
CPC .......... *H04L 63/0263* (2013.01); *G06F 9/545* (2013.01); *H04L 9/3247* (2013.01); *H04L 63/205* (2013.01)

(58) Field of Classification Search
CPC . H04L 63/0263; H04L 9/3247; H04L 63/205; H04L 9/0643; H04L 9/0894; H04L 9/3239; H04L 63/0227; H04L 63/0236; H04L 63/0245; H04L 63/123; G06F 9/545
USPC .......................................................... 726/1
See application file for complete search history.

(56) References Cited

FOREIGN PATENT DOCUMENTS

| EP | 4141666 A1 * | 3/2023 | ............. G06F 21/53 |
| WO | WO-2007120165 A2 * | 10/2007 | ............ H04L 43/026 |

* cited by examiner

*Primary Examiner* — Bryan F Wright
(74) *Attorney, Agent, or Firm* — Weiss & Arons LLP

(57) ABSTRACT

Apparatus and methods for enhanced kernel security in a cloud environment is provided. The apparatus may include a system architecture including a firewall intercepting all incoming data packets routed to the kernel. The firewall may accept or reject a packet based on a rules-based determination comprising extracting a packet header from the packet, identifying a rule stored in a rules database associated with the packet header, the rule defining an allowable executable command for being included in the packet. The system architecture may include a validator configured to extract a signature from the packet, the signature comprising cryptography hash values, and query a signature vault to identify a stored signature identical to the extracted signature. The system architecture may further include an approver for routing the packet to the kernel and the kernel for running one or more containers in the cloud environment.

6 Claims, 6 Drawing Sheets

ENHANCING KERNEL SECURITY IN CLOUD ENVIRONMENT BY PERFORMING A RULES-BASED ANALYSIS OF INCOMING DATA PACKETS BEFORE ROUTING THEM TO THE KERNEL

FIELD OF TECHNOLOGY

Aspects of the disclosure relate to enhancing the security of cloud environments. In particular, aspects of the disclosure relate to enhancing the security of the kernel, and of containers managed by the kernel, in cloud environments.

BACKGROUND

Containers are a critical part in cloud environments because they are inherently equipped to run arbitrary code with minimal overhead. This makes them a valuable asset to the organizations trying to deliver code or applications at speed and scale rapidly.

However, containers face security risks at every stage of the deployment, from building the run-time images to production phases. Hence with growth of data and applications that are running on the cloud on distributed containers, organizations are at risk due to the poor security frame that has gone unnoticed in the container architecture.

The kernel is responsible for managing the containers. The kernel has root access to the containers, and is responsible for scheduling programs to run, reading and writing addresses on disk and memory, and more. The kernel's root access to the containers poses a possible problem on a multi-cloud environment system, for if an attacker gains root access through the kernel, the attacker can proceed to deploy malware on any of the containers and perform unauthorized, remote actions. Such exploits can put the whole ecosystem of containers and the host at a high risk.

It would be desirable, therefore, to provide systems and methods for modifying kernel architecture to control transmission of communications to the kernel to protect kernel and container integrity.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
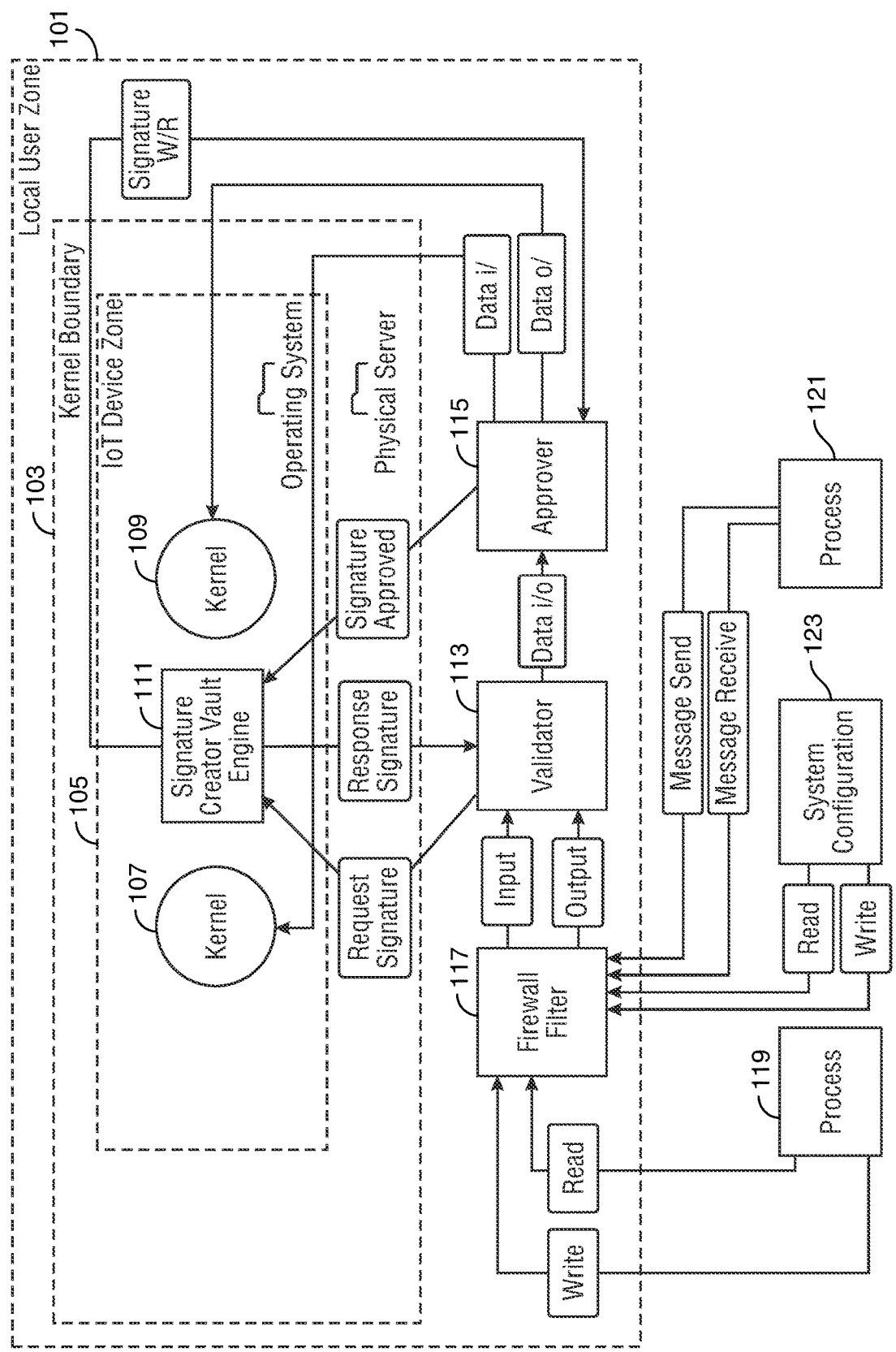
FIG. 1 shows illustrative apparatus and methods in accordance with the invention.

Apparatus, methods and a system architecture for enhancing kernel security in a cloud environment is provided. For the purposes of the application, reference below to 'apparatus' is to be understood as referring to a 'system architecture' as well.

The apparatus may include a local user zone including a container and a kernel. The apparatus may include two or more containers and two or more kernels. The apparatus may also include one or more of a firewall, a validator, an approver, a signature vault, and any other apparatus described herein. Exemplary configurations, user zones and apparatus that may be included in the systems and methods of the invention are illustrated in FIGS. 1-4 of the application and described below.

The apparatus may include the firewall. The firewall may be referred to alternately herein as a 'firewall filter.' The firewall may be configured to intercept all incoming data packets routed to the kernel from outside the local user zone. The firewall may have the capability to encrypt incoming and outgoing data packets. The firewall may not allow any communications received from outside the local user zone to be transmitted directly to the kernel.

The firewall may accept or reject a packet based on a rules-based determination. The rules-based determination may include extracting a packet header from the packet and identifying a rule stored in a rules database associated with the packet header. The rule may define an allowable executable command for being included in the packet. In some embodiments, the identifying the rule stored in the rules database may include identifying a rule stored in a rules database that is associated with an IP address included in the packet header.

The firewall may be configured to deny the packet access through the firewall when an executable command included in the packet is different from the allowable executable command. The firewall may be further configured to transmit the packet through the firewall to a validator when the executable command included in the packet is the allowable executable command.

In some embodiments, the rules-based determination executed by the firewall may include a first override feature. The first override feature, when triggered, may allow the packet to circumvent the rules-based determination and be automatically transmitted through the firewall to the validator. The first override feature may be triggered when the packet is determined, by the firewall, to have been transmitted to the kernel from a server included in a group of predetermined servers.

In some embodiments, the rules-based determination executed by the firewall may include a second override feature. The second override feature, when triggered, may reject the packet prior to executing the rules-based determination, wherein the second override feature is triggered when the packet is determined, by the firewall, to have been transmitted to the kernel from an IP address included in a group of predetermined IP addresses.

The apparatus may include the validator. The validator may be configured to extract a signature from the data packet. In some embodiments, the signature may include cryptography hash values. The validator may be further configured to query a signature vault to identify a stored signature identical to the extracted signature. The signature vault may be referred to alternately herein as a 'signature creator vault engine.' In some embodiments, the query may include determining if a signature stored in the signature vault and associated with the IP address in the signature vault is identical to the signature extracted from the packet.

In response to the query failing to identify a stored signature identical to the extracted signature, the validator may deny the packet access to the kernel. In some embodiments, the query may return a null value then the query fails to identify a stored signature identical to the extracted signature. In some embodiments, in response to the query returning a null value, the validator may deny the packet access to the kernel.

In some embodiments, denying the packet access may include destroying the packet. In some embodiments, the validator may be configured to deny the packet access when the validator fails to identify a signature, in the packet, for extraction.

The validator may be configured to query the signature vault to identify a stored signature identical to the extracted signature. In some embodiments, the identification may include querying the signature vault to identify a stored signature, associated with an IP address stored in the packet header, that is identical to the extracted signature.

In some embodiments, in response to the identification of an identical stored signature, the validator or the signature vault may be configured to tag the identical stored signature stored in the signature vault with an electronic tag.

The apparatus may include an approver. In response to the identification of an identical stored signature, the validator may be configured to transmit the packet to the approver. When the signature stored in the signature vault is associated with an IP address, then, in response to the query identifying a signature stored in the signature vault and associated with the IP address that is identical to the signature extracted from the packet having originated from the IP address, tagging the signature stored in the signature vault and transmitting the packet to an approver.

The approver may be configured to confirm approval of the signature. The approver may be configured to route the packet to the kernel. The approver may be further configured to accept the signature extracted from the packet after the validator identifies the identical stored signature in the signature vault.

The aforementioned three-tier system of requiring all data packets to be passed through the firewall, validator and approver, and subjected to the associated validation protocols, is built to avoid the kernel receiving infected data packets generated by malware, IP spoofing, reconnaissance, sequence number prediction, session hijacking using root, setuserid (SUID) processes and shells, Trojan horses, backdoor, rootkits, or any other type of undesirable transmissions.

The apparatus may include the kernel. The kernel may be configured to run one or more containers in the cloud environment. The kernel may also be configured to execute the executable command included in the packet. Execution of the executable command may include the kernel executing the command or the kernel forwarding the command to a container with instructions for the container to execute the command.

The apparatus may include the kernel or the signature creator vault engine executing an assertion check. The assertion check may be used to determine if the executable command was executed successfully. The signature creator vault engine, in response to an assertion check validating that the executable command was executed successfully, may be configured to delete the tagged, identical stored signature, generate a new signature, and store the new signature in the signature vault. When the signature vault stores the new signature in the signature vault, the signature vault may associate the new signature with the allowable executable command and/or the IP address of the data packet.

The signature creator vault engine may be configured to transmit the new signature to the IP address. The IP address may be included the data packet transmitted to the kernel. The IP address may be the IP address the transmitted the data packet to the kernel. Thus, the application receiving the new signature may now be able to transmit a new data packet to the kernel using the new signature. This may allow for uninterrupted transmissions form the application to and from the kernel, with enhanced permission settings leveraging a new, unique signature for each data transmission.

The signature vault may be configured to store the new signature in the signature vault, to be used for future validation of the new signature. In some embodiments, the new signature may be associated with the IP address when stored in the signature vault.

In some embodiments, when the assertion check validates a failure of the executable command to execute, the kernel may be configured to retry the executable command. In some embodiments, when the retry of the executable command results in a failure of the executable command to execute, the signature vault may remove the tag on the identical stored signature. Thus, the stored, identical signature may not be deleted from the signature vault and may be used in the event that the firewall receives a re-send of the data packet from the IP address.

In some embodiments, a signature may be tagged only if the executable command included in the packet is a root-level executable command. A root-level executable command may be a command that, when executed, will implement one or more changes to the kernel and/or to one or more containers. In these embodiments, if the executable command is not a root-level command, the signature may not be tagged, no assertion check may be performed for the command, and the signature may thus not be later destroyed. As such, the signature may be later re-used by the appropriate IP address. A directory stored in the validator may be used to determine whether or not the executable command is a root-level executable command and, if it is, the validator may transmit an instruction to the signature creator vault to tag the signature if it is determined to be valid.

The systems and methods of the invention may include methods for providing enhanced kernel security in a cloud environment. The methods may include using the firewall to intercept all incoming data packets routed to the kernel. For each packet intercepted, the methods may include accepting or rejecting the packet based on the rules-based determination and, in some embodiments, one or more of the override features, described herein.

The methods may include extracting a packet header from the packet. The methods may include identifying a rule stored in the rules database that is associated with the packet header. The rule may define an allowable executable command for being included in the packet.

The methods may include denying the packet access through the firewall when an executable command included in the packet is different from the allowable executable command. The methods may include transmitting the packet through the firewall to a validator when the executable command included in the packet is the allowable executable command.

The methods may include using the validator to execute the method steps of extracting a signature from the packet, the signature comprising cryptography hash values, querying a signature vault to identify a stored signature identical to the extracted signature, in response to the query failing to identify a stored signature identical to the extracted signature, denying the packet access to the kernel, and, in response to the identification of an identical stored signature, tagging the identical stored signature and transmitting the packet to an approver.

The methods may include routing the packet to the kernel. The methods may include using a kernel to run one or more containers in the cloud environment and execute the executable command included in the packet. The methods may include, in response to an assertion check validating that the executable command was executed successfully, deleing the tagged, identical stored signature, generating a new signature, storing the new signature in the signature vault and transmitting the new signature to an IP address that transmitted the packet to the kernel.

The methods may include accepting the signature extracted from the packet after the validator identifies the identical stored signature in the signature vault. The methods may include the validator executing the method step of destroying the packet when the validator fails to identify a signature, in the packet, for extraction. The methods may include, when the assertion check validates a failure of the executable command to execute, retrying the executable command.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or programs or by utilizing computer-readable data structures.

FIG. 1 shows exemplary system architecture, apparatus and methods in accordance with the invention. In FIG. 1, process 121, system configuration 123, and process 119 are illustrated transmitting data to local user zone 101. The data may be data packets. The transmitted data is intercepted at firewall filter 117. Each of process 121, system configuration 123, and process 119 may be associated with an IP address. Each of process 121, system configuration 123, and process 119 may be generated by an application programming interface ("API"). The data transmitted to local user zone 101 by process 121, system configuration 123, and process 119 may be addressed to one of kernel 109 and kernel 107.

Firewall filter 117 may filter the incoming data packets using a rules-based determination described herein. Data packets that satisfy the rules-based determination may be transmitted to the validator. Data packets that fail to satisfy the rules-based determination may be rejected. The rejection of the data packets failing to satisfy the rules-based determination may not include an explanation from firewall filter 117 as to why the data packets were rejected.

Data packets satisfying firewall filter 117's rules-based determination may be transmitted to validator 113. Validator 113 may extract from each received data packet a signature. Validator 113 may request from signature creator vault engine 111 a signature identical to the signature extracted from the data packet. If a response signature, returned by signature creator vault engine 111 in response to the signature request, includes a null result—i.e. that no identical signature was identified—validator may reject the data packet. The rejection of a signature may include transmitting a message to the IP address that the signature was rejected. The rejection of a signature may not include sharing the correct, stored signature with the IP address. The correct, stored signature may be a signature associated with the IP address. If response signature identifies an identical signature stored in signature creator vault engine 111, validator may transmit the data packet to approver 115.

Approver 115 may check with signature creator vault engine 111 that the signature included in the data packet was approved by signature creator vault engine 111. In response to a determination that the signature was approved, approver 115 may route the data packet to a kernel included in kernel boundary 103. Specifically, approver 115 may route the data packet to one of kernel 107 or kernel 109.

In the system architecture illustrated in FIG. 1, firewall filter 117, validator 113 and approver 115 may be positioned in local user zone 101. Kernel 107, kernel 109 and signature creator vault engine 111 may be positioned in kernel boundary 103. Kernel boundary 103 may also include IoT device zone 105.

Figure 2:
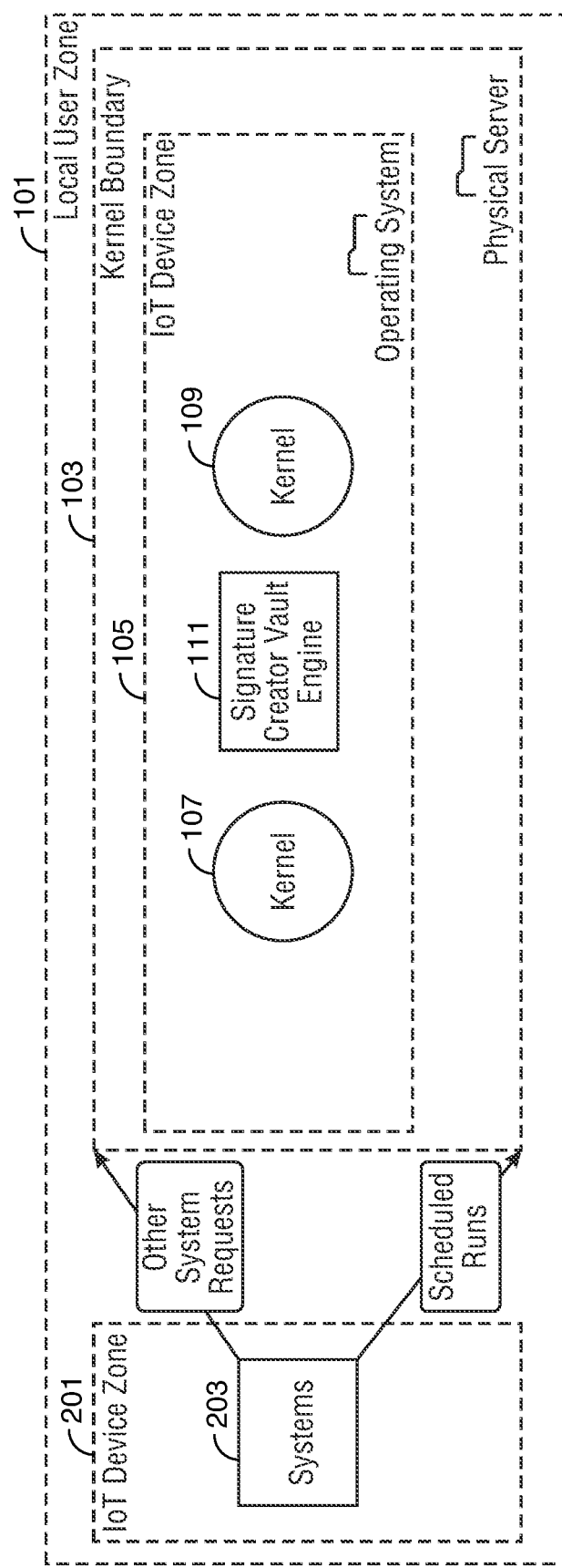
FIG. 2 shows illustrative apparatus and methods in accordance with the invention.

FIG. 2 shows IoT device zone 201 located within local user zone 101. IoT device zone 201 may include systems 203. Systems 203 may transmit scheduled runs and other system requests to devices located within kernel boundary 103.

Because systems 203 is located within local user zone 101, transmissions between systems 203 and kernel 107 and 109 do not need to pass through firewall filter 117.

Figure 3:
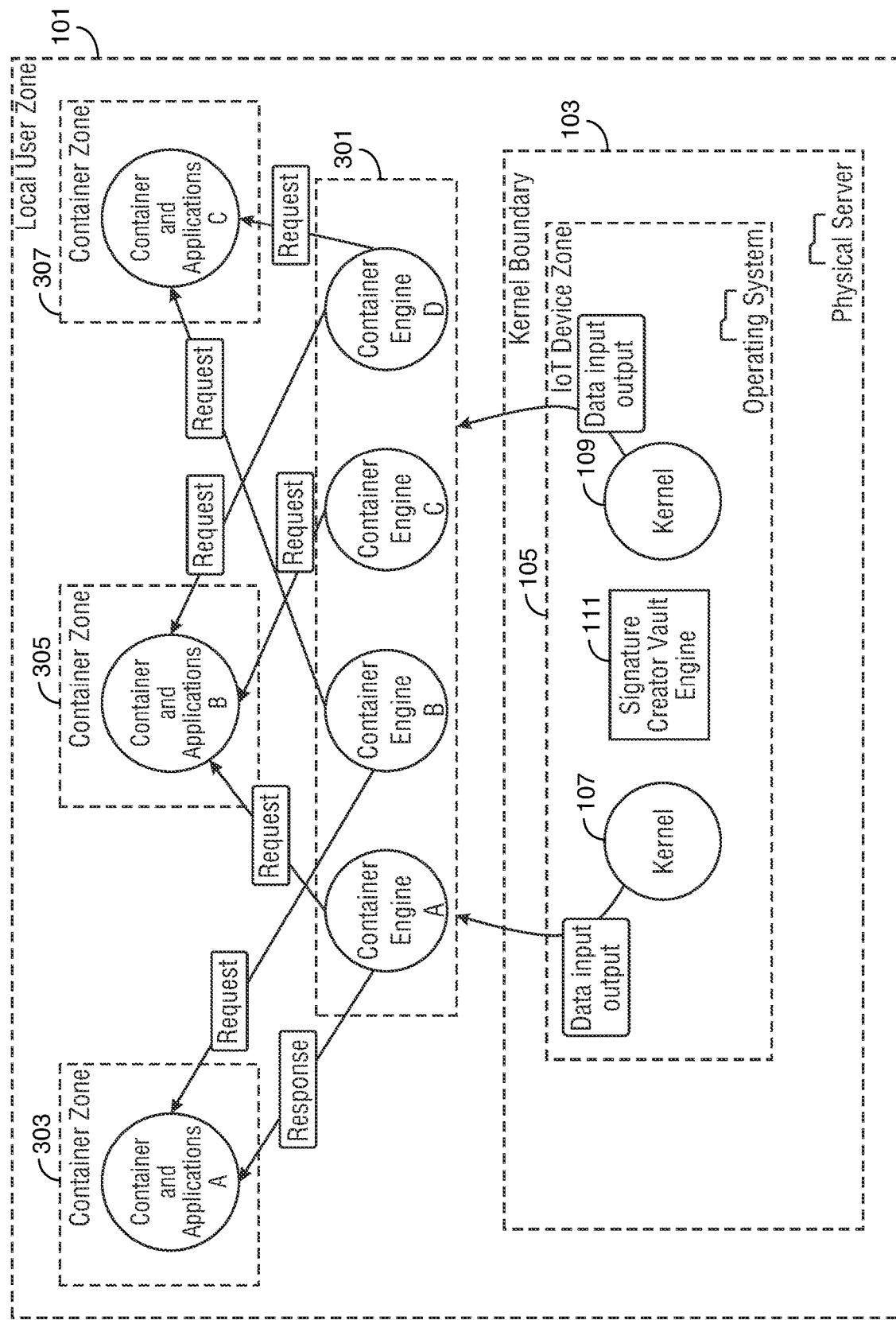
FIG. 3 shows illustrative apparatus and methods in accordance with the invention.

FIG. 3 shows kernels 107 and 109 transmitting requests to container engine space 301. Container engine space 301 may include one or more container engines, such as container engine A, container engine B, container engine C and/or container engine D. Each request may be routed to a one of the container engines. Each container engine may then route the request to one of container and applications A, container and applications B, and/or container and applications C to execute the request. The requests may be data packets received from one or more of process 121, system configuration 123, and process 119 which passed through the firewall and the validator and were routed by the approver to the kernel, and subsequently routed by the kernel to the container engines.

Container zone 303 may include container and applications A. Container zone 305 may include container and applications B. Container zone 307 may include container and applications C.

Figure 4:
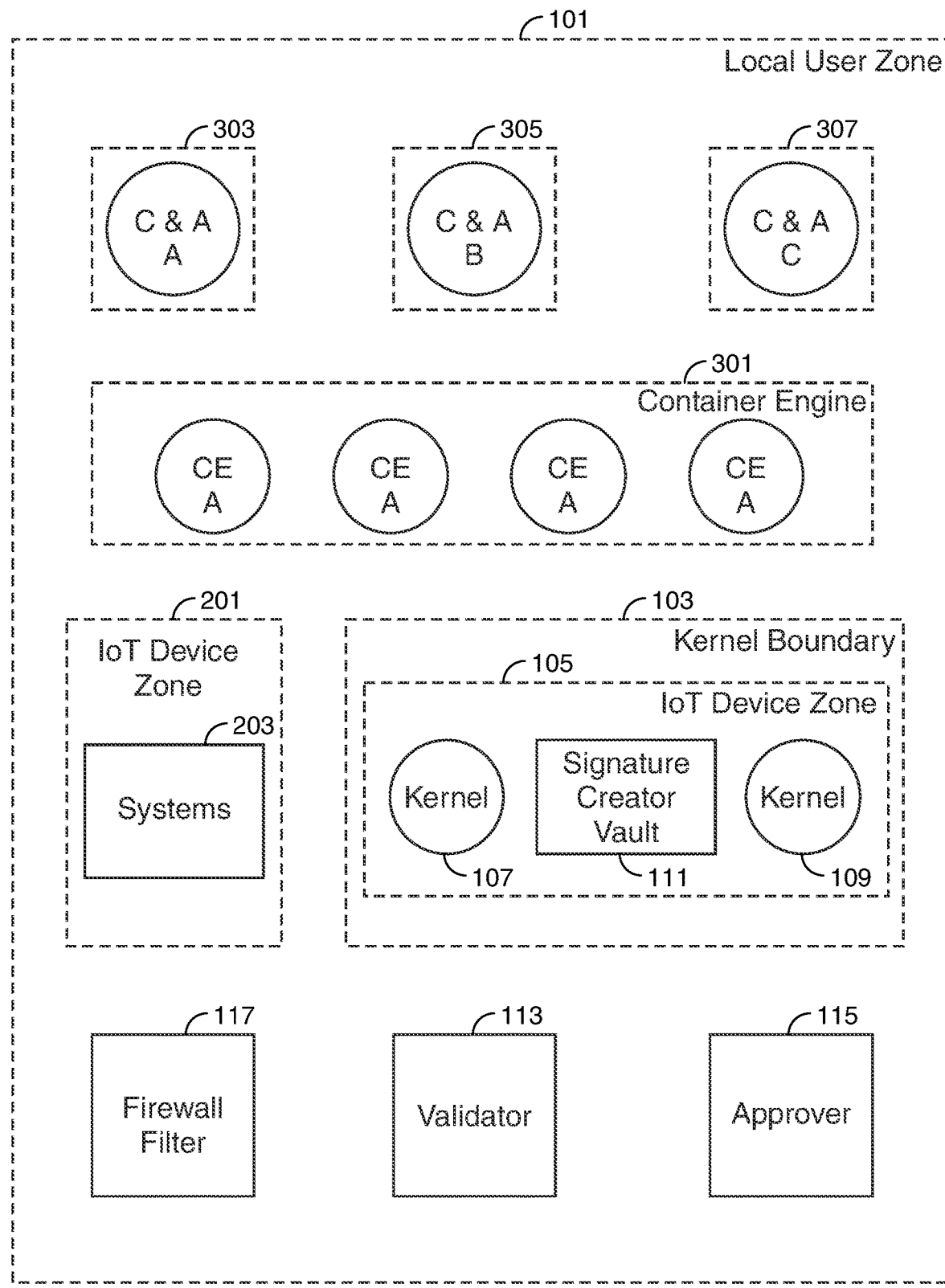
FIG. 4 shows illustrative apparatus and methods in accordance with the invention.

FIG. 4 shows a composite view of apparatus illustrated in FIGS. 1, 2 and 3.

Communications between apparatus illustrated in FIG. 4 may take place as illustrated in FIGS. 1, 2 and 3.

Figure 5:
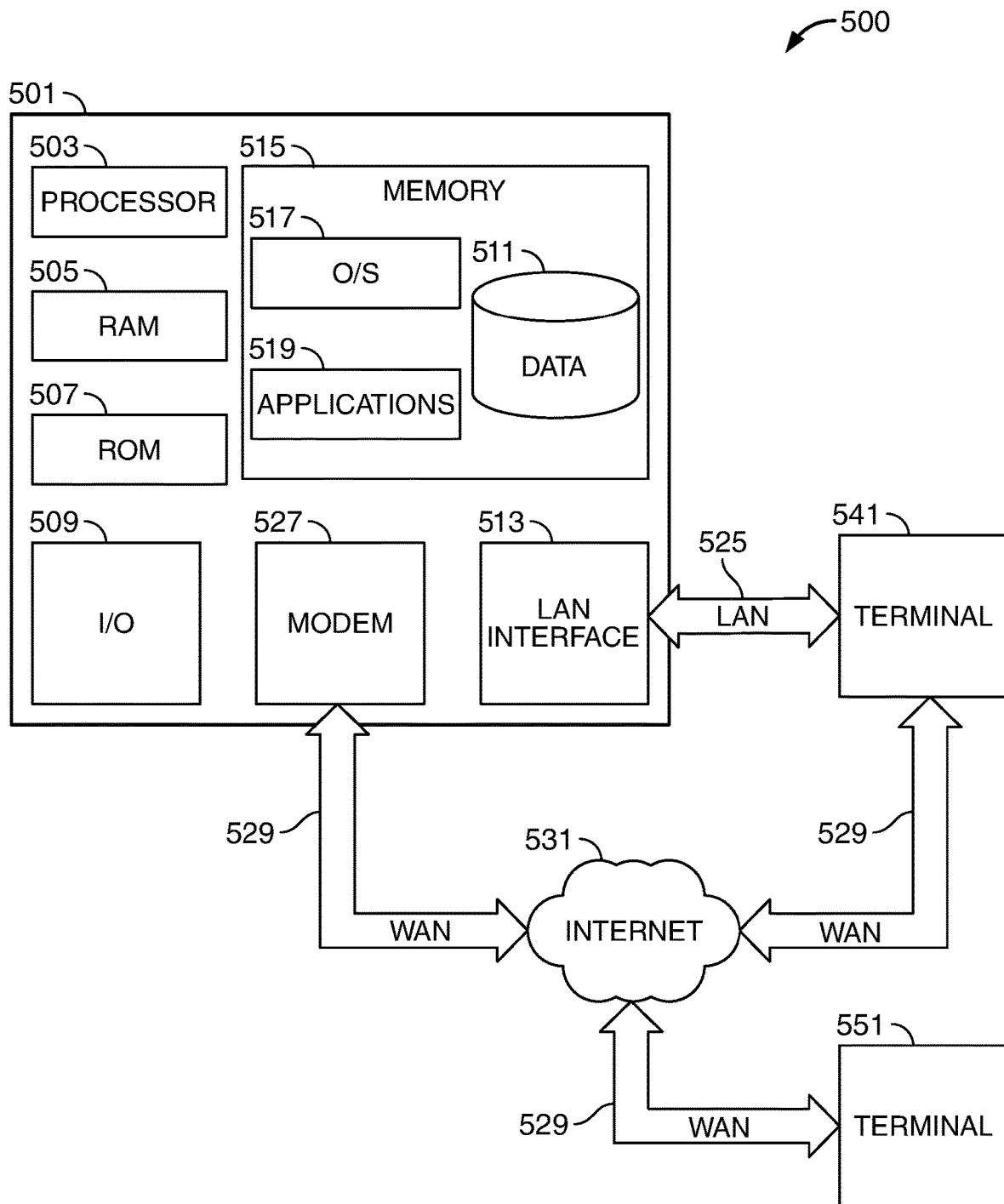
FIG. 5 shows an illustrative block diagram of apparatus in accordance with the invention.

FIG. 5 shows an illustrative block diagram of system 500 that includes computer 501. Computer 501 may alternatively be referred to herein as an "engine," "server" or a "computing device." Computer 501 may be a workstation, desktop, laptop, tablet, smart phone, or any other suitable computing device. Elements of system 500, including computer 501, may be used to implement various aspects of the systems and methods disclosed herein. Each of the apparatus illustrated in FIGS. 1, 2 and 3, including process 119, system configuration 123, process 121, firewall filter 117, validator 113, approver 115, kernel 107, kernel 109, signature creator vault engine 111, systems 203, container engine A, container engine B, container engine C, container engine D, container and applications A, container and applications B and container and applications C, may include some or all of the elements and apparatus of system 500.

Computer 501 may have a processor 503 for controlling the operation of the device and its associated components, and may include RAM 505, ROM 507, input/output circuit 509, and a non-transitory or non-volatile memory 515. Machine-readable memory may be configured to store information in machine-readable data structures. The processor 503 may also execute all software running on the computer—e.g., the operating system and/or voice recognition software. Other components commonly used for computers, such as EEPROM or Flash memory or any other suitable components, may also be part of the computer 501.

The memory 515 may be comprised of any suitable permanent storage technology— e.g., a hard drive. The memory 515 may store software including the operating system 517 and application(s) 519 along with any data 511 needed for the operation of computer 501. Memory 515 may also store videos, text, and/or audio assistance files. The data stored in Memory 515 may also be stored in cache memory, or any other suitable memory.

Input/output ("I/O") module 509 may include connectivity to a microphone, keyboard, touch screen, mouse, and/or stylus through which input may be provided into computer 501. The input may include input relating to cursor movement. The input/output module may also include one or more speakers for providing audio output and a video display device for providing textual, audio, audiovisual, and/or graphical output. The input and output may be related to computer application functionality.

Computer 501 may be connected to other systems via a local area network (LAN) interface 513. Computer 501 may operate in a networked environment supporting connections to one or more remote computers, such as terminals 541 and 551. Terminals 541 and 551 may be personal computers or servers that include many or all of the elements described above relative to computer 501. The network connections depicted in FIG. 5 include a local area network (LAN) 525 and a wide area network (WAN) 529, but may also include other networks. When used in a LAN networking environment, computer 501 is connected to LAN 525 through a LAN interface 513 or an adapter. When used in a WAN networking environment, computer 501 may include a modem 527 or other means for establishing communications over WAN 529, such as Internet 531. Connections between Computer 501 and Terminals 551 and/or 541 may be used for connections between firewall filter 117 and one or more of process 119, system configuration 123 and process 121.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 519, which may be used by computer 501, may include computer executable instructions for invoking functionality related to communication, such as e-mail, Short Message Service (SMS), and voice input and speech recognition applications. Application program(s) 519 (which may be alternatively referred to herein as "plugins," "applications," or "apps") may include computer executable instructions for invoking functionality related to performing various tasks. Application programs 519 may utilize one or more algorithms that process received executable instructions, perform power management routines or other suitable tasks. Application programs 519 may utilize one or more decisioning processes used by one or both of firewall filter 117 and validator 113 for whether or not to reject or accept a packet as detailed herein.

Application program(s) 519 may include computer executable instructions (alternatively referred to as "programs"). The computer executable instructions may be embodied in hardware or firmware (not shown). The computer 501 may execute the instructions embodied by the application program(s) 519 to perform various functions.

Application program(s) 519 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 511, and any other suitable information, may be stored in memory 515. One or more of applications 519 may include one or more algorithms that may be used to implement features of the disclosure comprising the processing and routing of data packets transmitted to local user zone 101 from applications outside local user zone 101.

The invention may be described in the context of computer-executable instructions, such as applications 519, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 501 and/or terminals 541 and 551 may also include various other components, such as a battery, speaker, and/or antennas (not shown). Components of computer 501 may be linked by a system bus, wirelessly or by other suitable interconnections. Components of computer 501 may be present on one or more circuit boards. In some embodiments, the components may be integrated into a single chip. The chip may be silicon-based.

Terminal 551 and/or terminal 541 may be portable devices such as a laptop, cell phone, Blackberry™, tablet, smartphone, or any other computing system for receiving, storing, transmitting and/or displaying relevant information. Terminal 551 and/or terminal 541 may be one or more user devices. Terminals 551 and 541 may be identical to computer 501 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, and/or smart phones, multiprocessor systems, microprocessor-based systems, cloud-based systems, programmable consumer electronics, network PCs, minicomputers, mainframe computers, distributed computing environments that include any of the above systems or devices, and the like.

Figure 6:
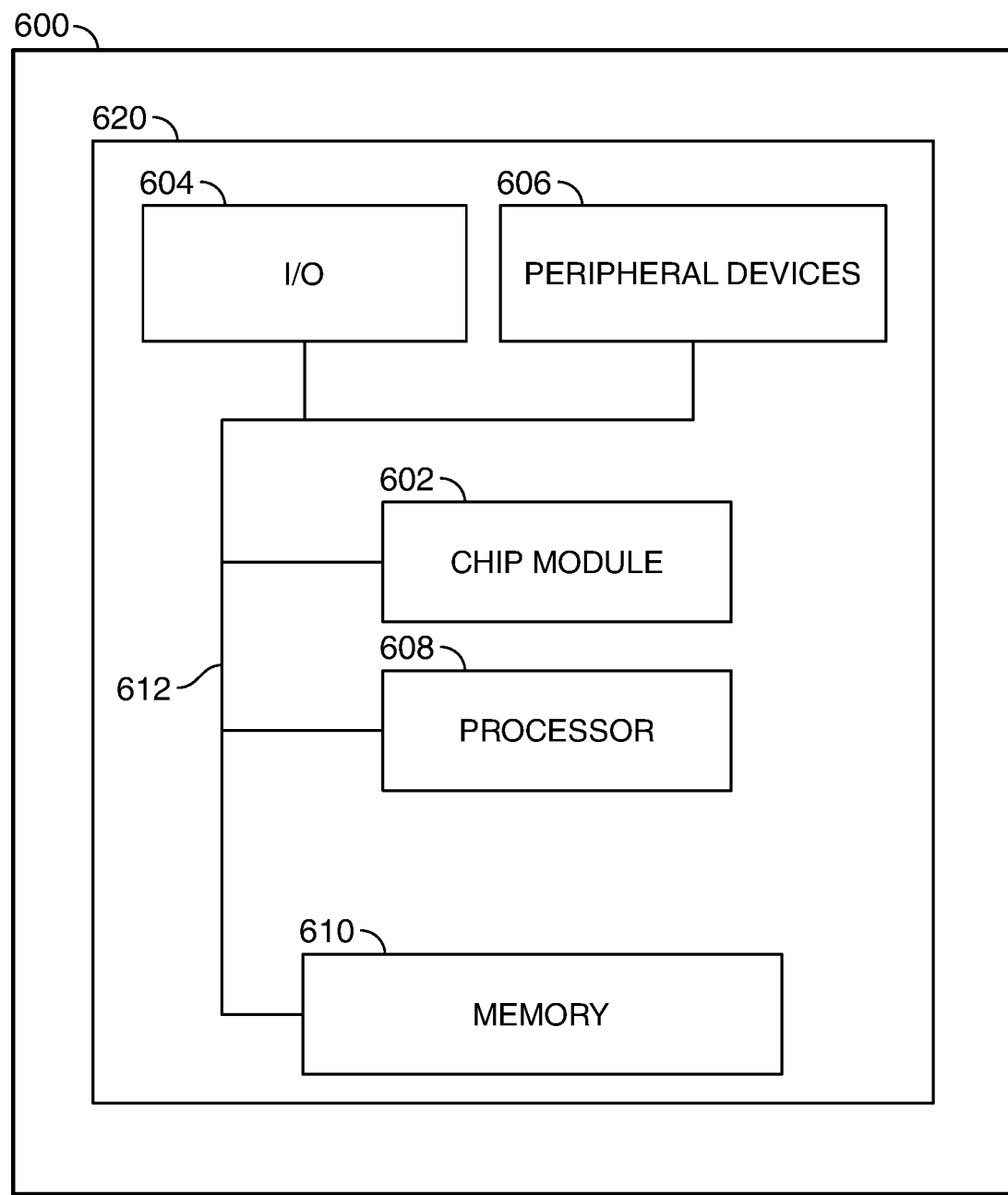
FIG. 6 shows illustrative apparatus that may be configured in accordance with the invention.

FIG. 6 shows illustrative apparatus 600 that may be configured in accordance with the principles of the disclosure. Apparatus 600 may be a computing device. Apparatus 600 may include one or more features of the apparatus shown in FIG. 5. Apparatus 600 may include chip module 602, which may include one or more integrated circuits, and which may include logic configured to perform any other suitable logical operations.

Apparatus 600 may include one or more of the following components: I/O circuitry 604, which may include a transmitter device and a receiver device and may interface with fiber optic cable, coaxial cable, telephone lines, wireless devices, PHY layer hardware, a keypad/display control device or any other suitable media or devices; peripheral devices 606, which may include counter timers, real-time timers, power-on reset generators or any other suitable peripheral devices; logical processing device 608, which may compute data structural information and structural parameters of the data; and machine-readable memory 610.

Machine-readable memory 610 may be configured to store in machine-readable data structures: machine executable instructions, (which may be alternatively referred to herein as "computer instructions" or "computer code"), applications such as applications 519, signals, and/or any other suitable information or data structures.

Components 602, 604, 606, 608 and 610 may be coupled together by a system bus or other interconnections 612 and may be present on one or more circuit boards such as circuit board 620. In some embodiments, the components may be integrated into a single chip. The chip may be silicon-based.

Thus, systems and methods for enhancing the security of cloud environments are provided. Persons skilled in the art will appreciate that the present invention can be practiced by other than the described embodiments, which are presented for purposes of illustration rather than of limitation.

What is claimed is:

1. A method for providing enhanced kernel security in a cloud environment, the method comprising:
    using a firewall to intercept all incoming data packets routed to the kernel;
    for each packet intercepted, accept or reject the packet based on a rules-based determination comprising:
    extracting a packet header from the packet;
    identifying a rule stored in a rules database associated with the packet header, the rule defining an allowable executable command for being included in the packet;
    denying the packet access through the firewall when an executable command included in the packet is different from the allowable executable command; and
    transmitting the packet through the firewall to a validator when the executable command included in the packet is the allowable executable command;
    using the validator to execute the method steps of:
    extracting a signature from the packet, the signature comprising cryptography hash values;
    querying a signature vault to identify a stored signature identical to the extracted signature;
    in response to the query failing to identify a stored signature identical to the extracted signature, denying the packet access to the kernel; and
    in response to the identification of an identical stored signature, tagging the identical stored signature and transmitting the packet to an approver;
    routing the packet to the kernel;
    using the kernel to run one or more containers in the cloud environment and execute the executable command included in the packet; and
    in response to an assertion check validating that the executable command was executed successfully:
    delete the tagged, identical stored signature;
    generate a new signature;
    store the new signature in the signature vault; and
    transmit the new signature to an IP address that transmitted the packet to the kernel.

2. The method of claim 1 wherein the rules-based determination further comprises an override feature, the override feature, when triggered, allowing the packet to circumvent the rules-based determination and be automatically transmitted through the firewall to the validator, wherein the override feature is triggered when the packet is determined, by the firewall, to have been transmitted to the kernel from a server included in a group of predetermined servers.

3. The method of claim 2, when the override feature is a first override feature, further comprising a second override feature, the second override feature, when triggered, rejects the packet prior to executing the rules-based determination, wherein the second override feature is triggered when the packet is determined, by the firewall, to have been transmitted to the kernel from an IP address included in a group of predetermined IP addresses.

4. The method of claim 1 further comprising accepting the signature extracted from the packet after the validator identifies the identical stored signature in the signature vault.

5. The method of claim 1 further comprising the validator executing the method step of destroying the packet when the validator fails to identify a signature, in the packet, for extraction.

6. The method of claim 1 further comprising, when the assertion check validates a failure of the executable command to execute, retrying the executable command.

* * * * *